United States Patent [19]

Techter et al.

[11] Patent Number: 5,010,651

[45] Date of Patent: Apr. 30, 1991

[54] PORTABLE CIRCULAR SAW

[75] Inventors: Ronald R. Techter, Lake Zurich; Gregg M. Mangialardi, Park Ridge; Raymond R. Esparza, Chicago, all of Ill.

[73] Assignee: Skil Corporation, Chicago, Ill.

[21] Appl. No.: 550,839

[22] Filed: Jul. 10, 1990

[51] Int. Cl.[5] ........................ B23D 51/02; B23D 47/02; B23D 50/00; B27C 5/00

[52] U.S. Cl. ........................................ 30/376; 30/375; 30/377; 144/136 R

[58] Field of Search ................. 30/374, 375, 376, 377; 83/471.2, 468, 747; 144/136

[56] References Cited

U.S. PATENT DOCUMENTS

| | | | |
|---|---|---|---|
| 3,262,472 | 7/1966 | McCarty | 30/376 |
| 3,292,673 | 12/1966 | Gregory | 30/377 |
| 3,977,080 | 8/1976 | Allaire | 30/376 |
| 4,078,309 | 3/1978 | Wilson | 30/375 |
| 4,589,208 | 5/1986 | Iwasaki et al. | 30/376 |

OTHER PUBLICATIONS

Power Tool Catalog of Skil Corporation, published Apr. 1989; Skil Price lists for Jan. 1, 1990 and Jul. 1, 1990; and Pairis Enterprises brochure.

*Primary Examiner*—Douglas D. Watts
*Assistant Examiner*—Paul M. Heyrana, Sr.
*Attorney, Agent, or Firm*—Jones Day Reavis & Pogue

[57] ABSTRACT

A portable circular saw with a 60° bevel cut capability that is provided by a combination of blade diameter, height of front and rear pivot points above the footplate, the ability to tip the saw about a front hinge point to avoid projections contacting the footplate at a 60° angle and recesses and orifices provided in the footplate at points where interference would normally occur between the motor housing assembly and the saw blade when the blade is at a 60° bevel angle so as to prevent any interference of the footplate with the motor housing assembly and saw blade. A positive stop is provided at angles of 45° and 60°.

8 Claims, 6 Drawing Sheets

FIG.5
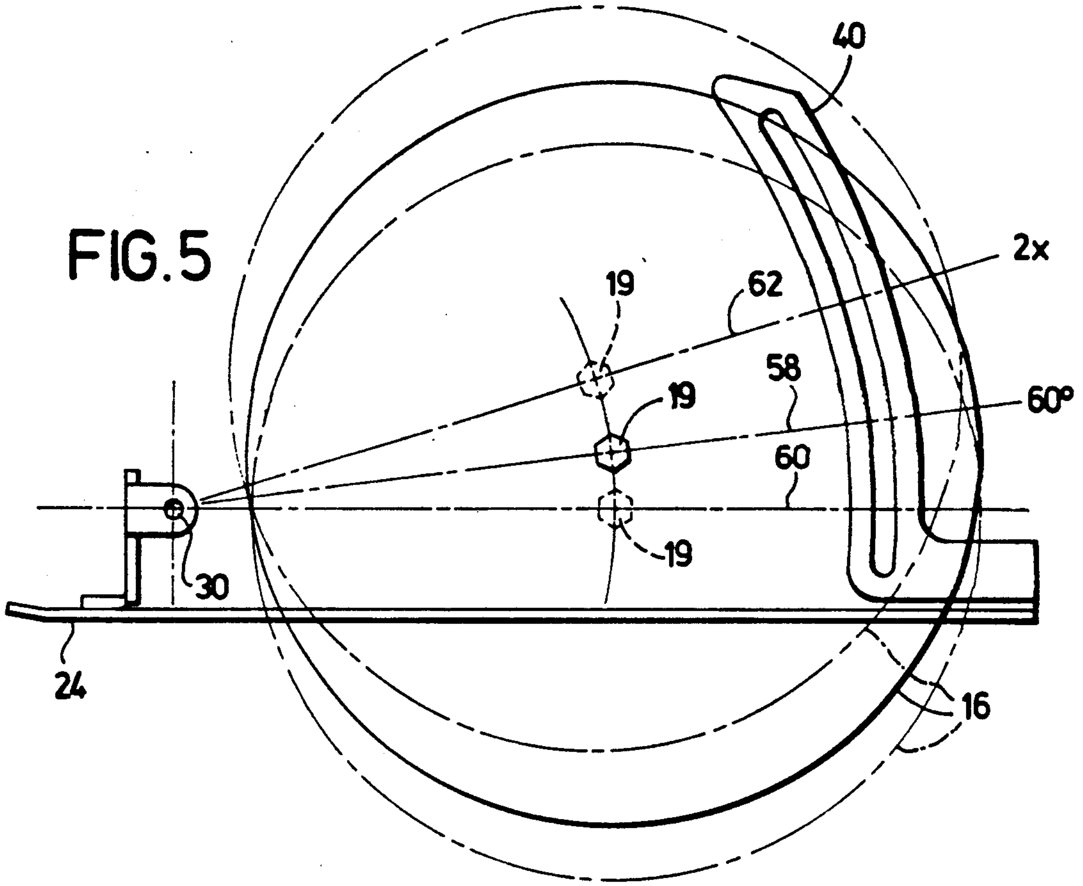
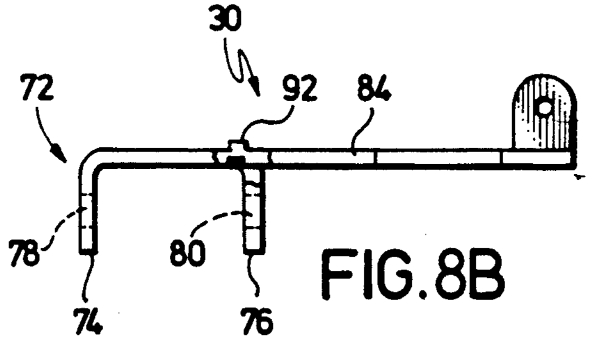
FIG.8B
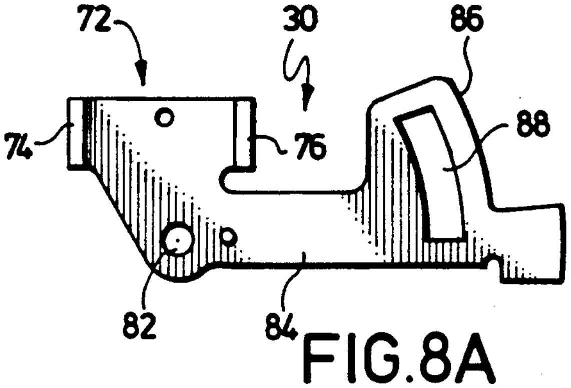
FIG.8A
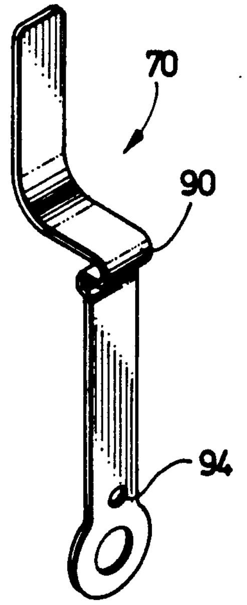
FIG.7

PORTABLE CIRCULAR SAW

FIELD OF THE INVENTION

This invention is related to portable circular saws. In particular, it is an improved portable circular saw that includes a footplate such that the saw may be operated at an angle of up to sixty degrees from the perpendicular with respect to a board or other workpiece that is to be cut.

BACKGROUND OF THE INVENTION

A portable circular saw comprises a circular saw blade, a motor to drive the blade, typically through reduction gearing, a support structure, a handle, a blade guard, and a foot or footplate. The footplate is typically either a drop foot or a pivot foot, either of which is designed to rest on a surface that is being cut, and is made to move to adjust the depth of cut and provide support for the motor and blade. A drop foot moves essentially parallel to itself and generally perpendicular to the axis of rotation of the saw blade and is often arranged to rotate with respect to a cut line to allow the saw to cut at an angle other than perpendicular to the surface of a workpiece. A pivot foot is constructed to rotate about two axes, one that is parallel to the axis of the saw blade to allow selection of the depth of cut and one that is contained in a plane perpendicular to the axis of the saw blade to allow selection of the angle of cut. The foot supports the portable circular saw on the surface of a workpiece to cut at an angle that may be other than perpendicular to the surface.

Portable circular saws are typically made in two styles. One style, called sidewinder, parallel shaft or simply circular saw, has an electric motor that is placed with its shaft parallel to the axis of rotation of a circular saw blade, so that the motor speed is reduced by a set of spur gears, typically, although not necessarily, helical spur gears. The other style of portable circular saw, called a worm drive circular saw, or more recently a hypoid gear variation thereof, has an electric motor that is placed with its shaft in a plane perpendicular to the axis of rotation of the saw blade, so that the speed reduction is produced by a set of worm gears or a hypoid gear set. For either the sidewinder or the worm drive, saw cuts at an angle to the surface of the material being cut are guided by a foot such as those described above. The saw is rotated about front and rear pivot points on an axis parallel to the cut that is to be made and at an angle determined by a setting of the blade with respect to the foot. Pivotal movement of the motor and blade can also take place about a hinge having an axis parallel to the axis of the rotation of the saw blade. The hinge may be associated with either the front or rear pivot. This pivotal movement is effected in a direction so that the motor is raised from or lowered to the surface of the material being cut. The motor is rotatably adjustable about the front and rear pivot points with respect to the foot and is typically adjustable continuously up to an angle of 45°, since cuts at angles greater than 45° have had to be made by cutting the workpiece while tilting the saw or the workpiece. This is very dangerous and is not recommended. The foot has a quadrant that is usually marked at angles of 0, 15, 30 and 45 degrees and is often fixed with detents to mark these angles for increased convenience in angle cutting.

It may be desirable to make a cut with a portable circular saw at an angle as great as 60° to the surface of a workpiece. This would be especially likely in cutting what is often referred to as "two-by" or "2X" lumber in a single cut and would be very advantageous. This would be an advantage in that it would increase efficiency in general carpentry and in particular in framing work, which is a specialized branch of carpentry devoted to erecting wooden frames for structures.

An important safety feature that is generally required on portable circular saws is a blade guard that covers the blade when the saw is not in use and that includes a lower guard cover that rotates about the axis of the saw blade to uncover the teeth of the blade when a cut is being made. When a bevel cut is being started perpendicular to the edge of a board, the blade cover is typically pushed out of position automatically as an operator advances the saw and starts the cut. Normally, when a bevel cut is being started at an angle to the edge of a board, the operator must operate a lever manually to rotate the blade cover out of the way to let the blade make contact with the board. Any rotation of the motor and blade with respect to the foot to allow a cut at an angle other than perpendicular to the surface of a workpiece must provide for proper operation of the moveable lower blade guard so that the blade is covered when the saw is not in use and is retracted to permit a cut when the saw is placed in position to cut on a workpiece.

The improved portable circular saw disclosed herein permits rotation of the saw blade up to an angle of 60° from the vertical with respect to the foot and the surface of the workpiece. This permits the cutting of lumber having a 2-inch nominal dimension in a single cut at 60°. The improved saw provides for operation of the lower blade guard at any angle to which the blade can be set and at any initial angle of cut with respect to the edge of a workpiece.

Thus it is an object of the present invention to provide a portable circular saw that will cut through 2X lumber or other material at an angle of 60° from the vertical.

It is another object of the present invention to provide a circular saw that will protect the user with a lower blade guard that covers the lower portion of the blade when the saw blade and motor are at an angle of 60° with respect to the footplate and the saw is not being used.

It is still another object of the present invention to provide a portable circular saw that will cut through 2X lumber at an angle of 60° and which is mounted on a foot that is of substantially standard size and which has sufficient strength to provide a safe mounting platform for the motor and saw blade.

It is yet another object of the present invention to provide a circular saw that will cut through 2X lumber or other material at an angle of 60° from the vertical by utilizing a change in depth of cut or blade elevation in conjunction with the angle of blade rotation to achieve the 60° cut.

It is also an object of the present invention to provide a positive stop at 45° that has a manual override to allow the saw to continue to pivot to 60°.

Other objects will become apparent in the course of the detailed description of the invention.

SUMMARY OF THE INVENTION

The present invention relates to a circular saw for cutting 2X lumber at an angle of 60° with the vertical comprising a circular saw blade having a diameter of at least eight and one-quarter inches, a motor and housing assembly attached to the saw blade, a footplate having an opening therein for receiving the saw blade, a front and a rear pivot point on the footplate and connected to the motor and housing assembly for enabling the motor and housing assembly and attached saw blade to be rotated at least 60° from the vertical, the front and rear pivot points having a height above the footplate such that when maintaining the saw motor and housing in substantially the horizontal position, the distance of the lowest portion of the saw blade below the footplate will have a vertical component sufficient to pass through 2X lumber when the blade is rotated 60° from the vertical, a pivoting device preferably coupled to the front pivot point for enabling the depth of the saw extending below the footplate to be adjusted by pivoting the motor and housing assembly upwardly or downwardly about the pivoting device in the plane of the saw blade, and a depth-of-cut bracket mounted on the footplate of the motor and housing assembly and having indicia thereon to indicate the depth of cut when the housing is pivoted about the pivoting device to the position indicated, the bracket having 60° indicia thereon to indicate the proper pivot angle of the motor housing for a 60° cut.

The invention also relates to a method of enabling a circular saw to cut through 2X lumber at an angle of 60° from the vertical comprising the steps of mounting a circular saw blade having a diameter of at least 8¼ inches on a motor and housing assembly, rotatably mounting the housing assembly on a footplate with the saw blade extending through and below an opening in the footplate a distance such that, when rotated at an angle of 60° from the vertical, the saw blade will have a vertical component sufficient to pass through a 2X piece of lumber, pivotally mounting the housing assembly on the footplate to allow the depth of cut of the saw blade to be adjusted, and adjusting the depth of the cut in conjunction with the rotation of the housing to 60° to provide clearance between the footplate and the housing at the 60° angle thereby enabling a 60° cut to be made through 2X lumber.

BRIEF DESCRIPTION OF THE DRAWINGS

These and other objects of the present invention will be more fully understood in conjunction with the accompanying drawings in which like numerals represent like components and in which:

FIG. 5 is a schematic representation of a footplate cross section illustrating the depth-of-cut bracket and the manner of adjusting the depth of cut of the saw by pivoting the saw about a pivot device such as a hinge;

FIG. 7 is an isometric view of the spring stop that provides a positive stop at 45° and requires manual operation to allow the saw blade to be adjusted beyond 45° to the 60° position;

FIG. 8A is a front view of a forward hinge plate used as a pivoting device about which the motor and saw blade are adjusted for depth of cut;

FIG. 8B is a top view of the hinge plate of FIG. 8A;

DETAILED DESCRIPTION OF THE DRAWINGS

Figure 1:
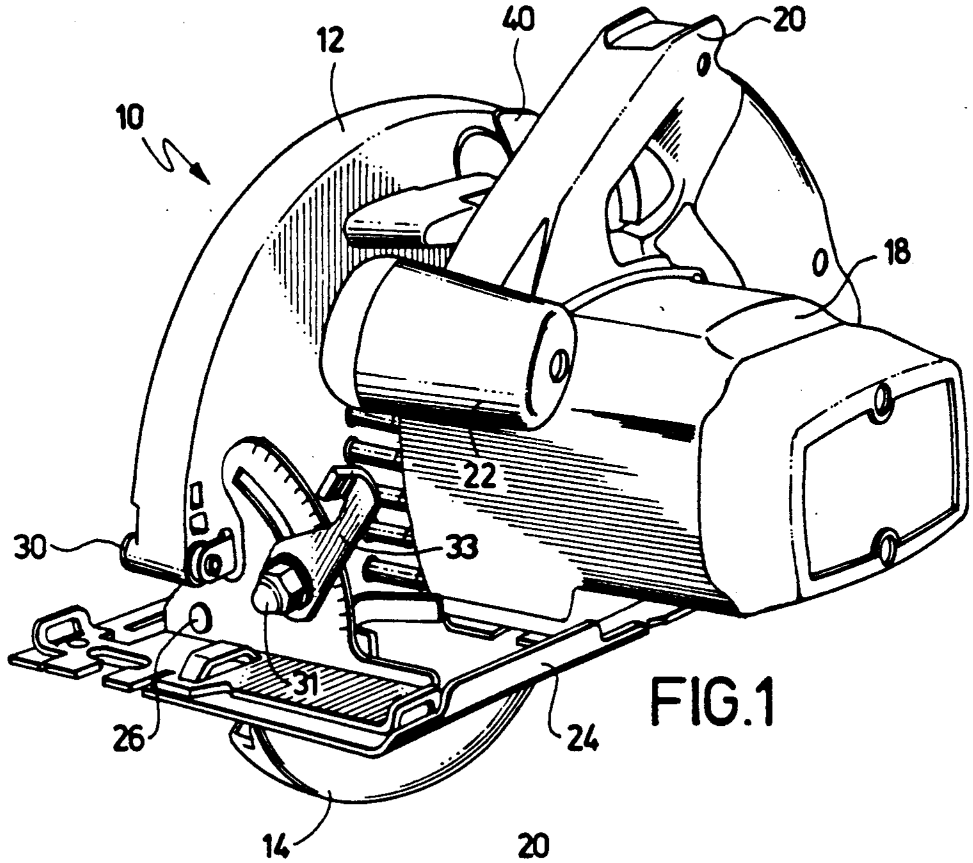
FIG. 1 is an isometric view of the novel circular saw.
Figure 2:
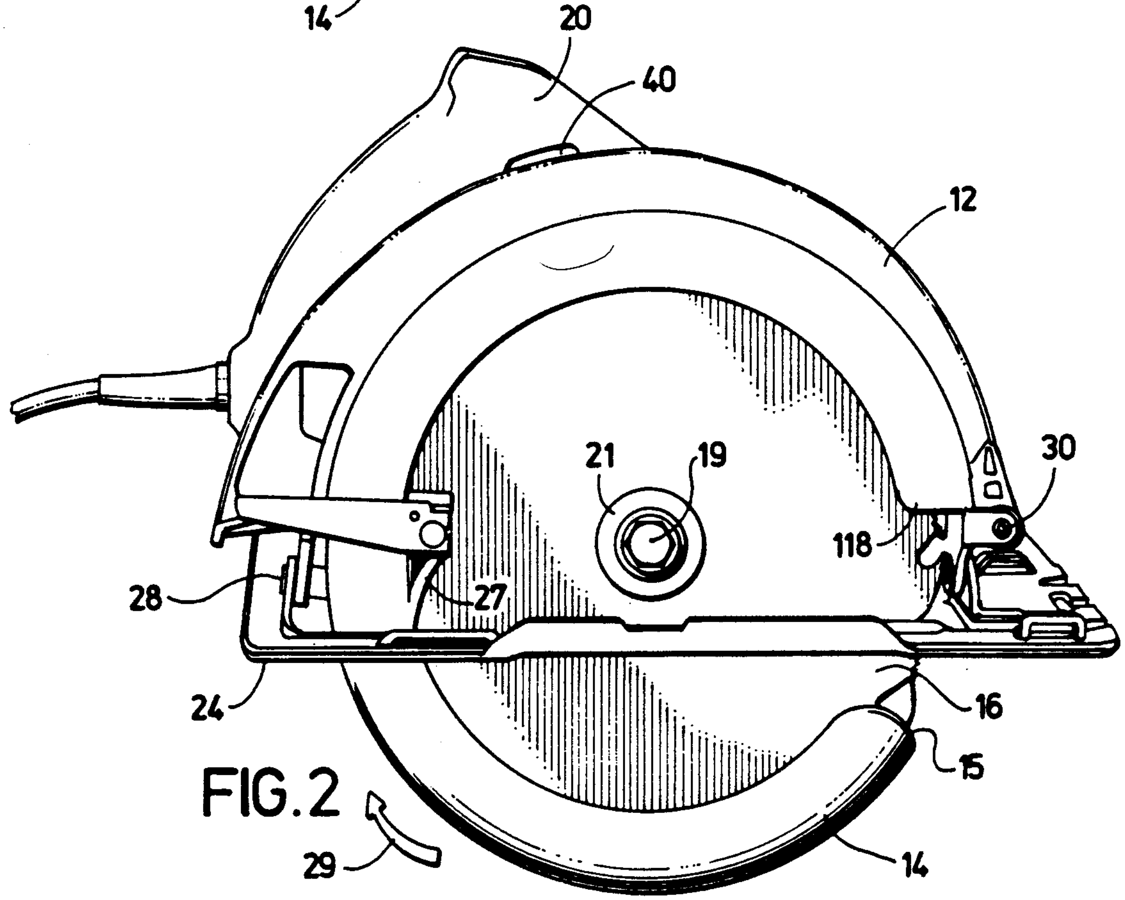
FIG. 2 is a side view of the blade side of the novel circular saw.

The novel circular saw for cutting 60° bevel angles is illustrated in an isometric view in FIG. 1 and in a side view in FIG. 2. The saw 10 includes an upper guard 12 and a lower guard 14 which houses a circular saw blade 16. The saw blade is attached to a motor in guard 18 by means of a bolt 19. The saw is operated by the user grasping handles 20 and 22. A foot or footplate 24 forms the base for the saw 10 and the saw is mounted to foot 24 by front and rear pivots 26 and 28, respectively. As will be more fully described hereafter, these pivot points allow the circular saw blade 16 to be tilted with respect to the foot 24 from the vertical up to 60° for cutting various beveled angles. In addition, the forward end of upper guard 12 of the circular saw 10 is attached at hinge 30 for movement in the vertical plane to regulate the depth of cut. While the hinge 30 is shown attached to the front pivot point 26, it could be attached at the rear pivot point 28 by any type of hinge such as a ball-shaped mounting well-known in the art. A depth-of-cut bracket 40 is associated with rear pivot point 28 and is attached to the saw guard 12 to regulate the depth of cut by pivoting the saw 10 with respect to hinge point 30 in the vertical plane to raise or lower blade 16 with respect to the foot 24. Lower guard 14, as is well known in the art, pivots about the center of the saw blade 16 to uncover the blade as it is fed into the work to cut a particular material.

Figure 3A:
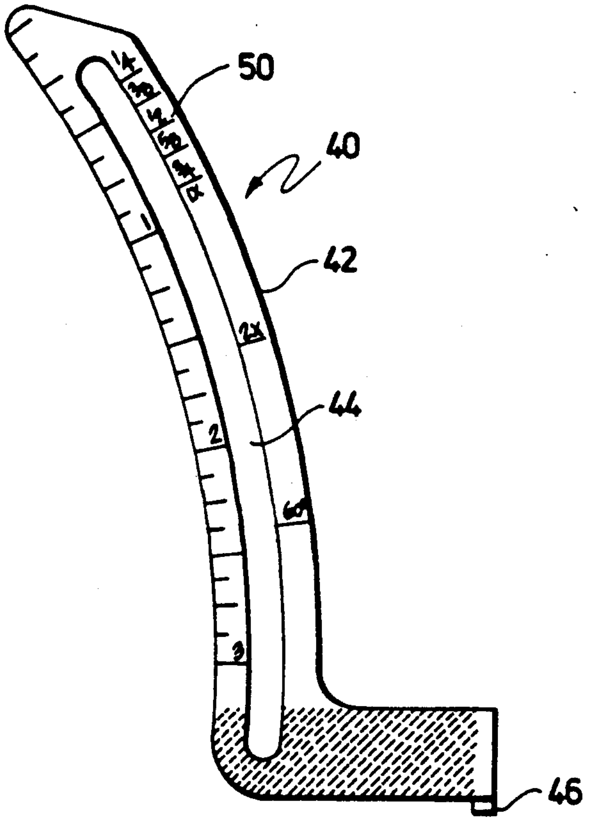
FIG. 3A is a side view of the depth-of-cut bracket associated with the circular saw.

A side view of the depth-of-cut bracket 40 is illustrated in FIG. 3A. The main body 42 of the bracket 40 is arcuate in shape and has a center slot 44 through which a bolt on guard 12 can project with a quick lock thereon to lock the saw at a particular angle as designated on the bracket 40 for regulating the depth of cut of the saw. The bracket is attached to the footplate by flange 46 which has an orifice 48 therein through which the bolt at the rear pivot point 28 is attached. It will be noted that various indicia 50 are imprinted on the bracket 40. Thus, if the saw were tipped upwardly about pivot point 30 to the top of bracket 40, the saw would be set for cutting plywood. As the other indicia indicate, there are locations identified for cutting one-quarter inch material, three-eighths inch material, one-half inch material, five-eighths inch material, three-quarter inch material, one-inch material and two-inch material. The notation 60° is also indicated. The 60° graduation mark is at an angle of approximately 7° and 15′ above the horizontal. This is important as will be discussed hereafter.

Figure 3B:
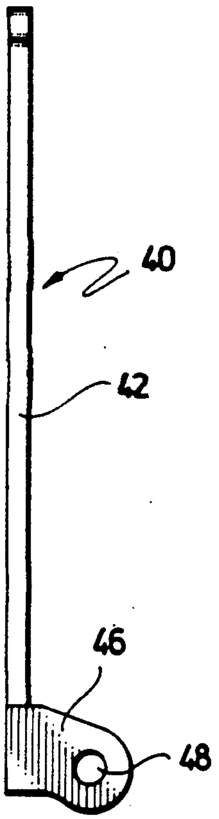
FIG. 3B is an end view of the depth-of-cut bracket of FIG. 3A.

FIG. 3B is an end view of the depth-of-cut bracket 40 illustrating the mounting flange 46 with orifice 48.

Figure 4:
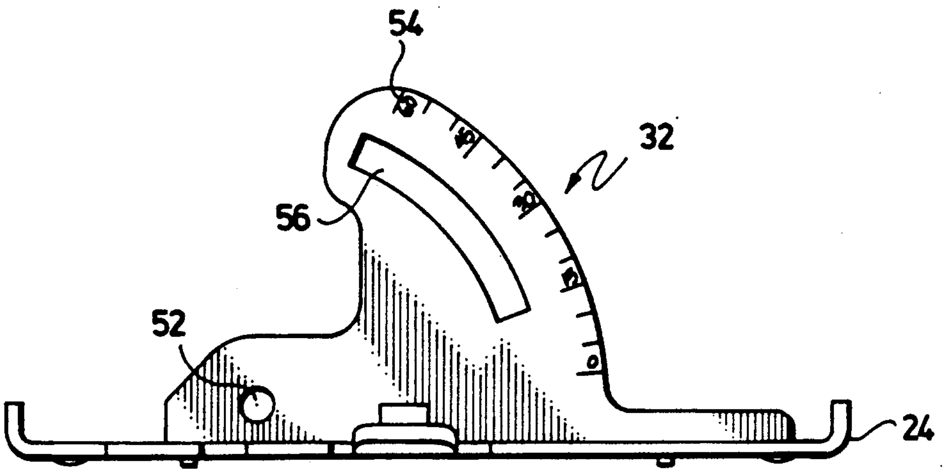
FIG. 4 is a front view of the quadrant having indicia thereon which indicate the angle of rotation or angle of cut to be made for a given rotation of the motor and saw blade with respect to the footplate.

The quadrant 32 is illustrated in detail in a front view in FIG. 4. Front pivot point 26 of the saw 10 illustrated in FIG. 1 and FIG. 2 has a bolt or rivet that passes through orifice 52 of quadrant 32 shown in FIG. 4. The quadrant 32 is attached to footplate 24 in an well-known manner such as by welding, riveting or bolting. Welding is preferred. Note that quadrant 32 has indicia 54 thereon including angles from 0°-60°. It also has a slot 56 therein for purposes that will be discussed hereafter.

As stated earlier, the nominal dimension of "2-by" lumber is actually about 1½ inches in planed lumber or lumber that has been cut to the plane dimension. In order to cut through a piece of 2X lumber at an angle of 60°, the blade 16 will have to extend below the foot 24 a minimum distance of 3 inches. This is true because the hypotenuse of the right triangle formed by the 60° cut times the cosine of 60° will have to equal 1½ inches. Since the cosine of 60° is 0.5, the hypotenuse will have to equal 3 inches which would be the vertical depth of the saw extending below footplate 24, as illustrated in FIG. 5. In the schematic illustration as shown in FIG. 5, the saw blade 16 is illustrated in solid lines positioned along line 58 illustrating the angle of tilt about hinge point 30 necessary for a bevel cut at a 60° angle. FIG. 5 also illustrates in dotted lines the position of saw blade 16 at the horizontal line 60 and in dotted lines the position of saw blade 16 along the 2X cut line 62. In each case, the saw would be held at the desired angle by means of a well-known quick-lock bracket attached to the depth-of-cut bracket 40. It is important that the hinge point 30 be of such a distance above footplate 24 that when the saw is adjusted to line 58 designating a 60° bevel cut, the saw blade 16 protrudes below footplate 24 the minimum distance of 3 inches. The importance of this requirement will be shown with relation to FIGS. 6A and 6B.

Figure 6A:
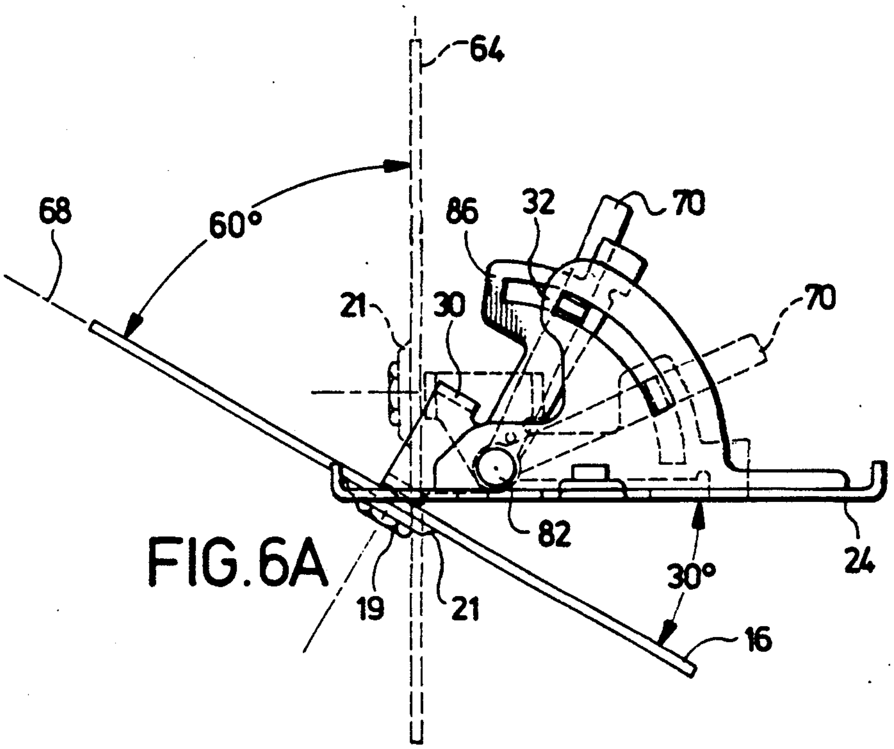
FIG. 6A is a schematic representation of a front cross-sectional view of the footplate illustrating the bevel angles of the saw blade with respect to the footplate.
Figure 6B:
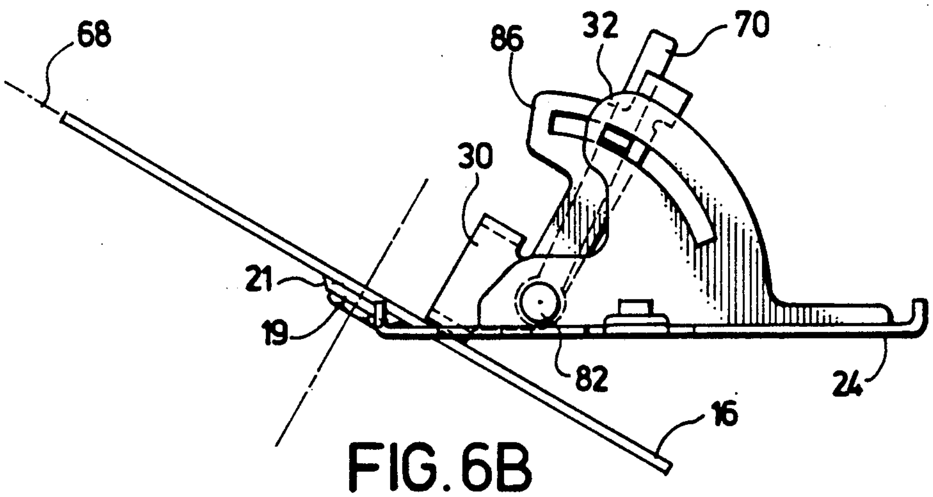
FIG. 6B is a schematic representation of a front cross-sectional view of the footplate illustrating the bevel angles of the saw blade with respect to the footplate when the depth of cut of the saw has been adjusted upwardly to provide clearance between the saw blade and the footplate.

FIG. 6A illustrates the saw blade 16 along position 64 which is in the vertical plane. Since this is a diagrammatic representation of the saw taken along a cross section of the footplate 24 from one end, it will be understood that the saw blade 16 can be pivoted to the 45° angle (not shown) and to the 60° angle as illustrated by line 68. Note that at the 60° angle along line 68, the bolt 19 which holds the saw blade 16 on the shaft of the drive motor is in contact with the side of footplate 24. Notice, however, in FIG. 6B that when the saw blade 16 is pivoted about hinge point 30 to the 60° line 58 as illustrated in FIG. 5, that the head of the bolt 19 and the blade washer 21 are raised sufficiently that they clear the side of footplate 24 and neither makes contact. Thus, by adjusting the saw blade 16 to the indicia indicating a 60° cut on depth-of-cut bracket 40 as shown in FIG. 5, and then rotating the saw blade 60° as shown in FIG. 6B, the desired 60° bevel cut through 2X lumber can be made without interference between the blade bolt 19 and washer 21 with the workpiece or the footplate.

Figure 10A:
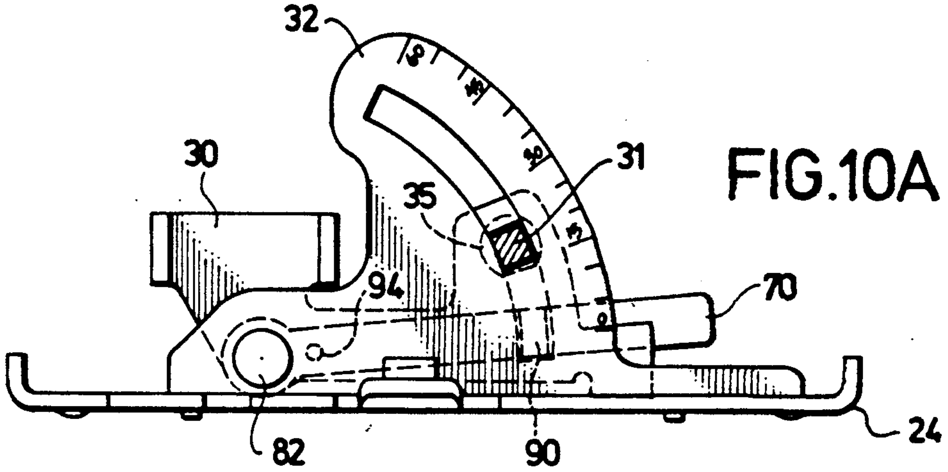
FIG. 10A is a front view of the quadrant and hinge with the spring stop in the 0° position.
Figure 10B:
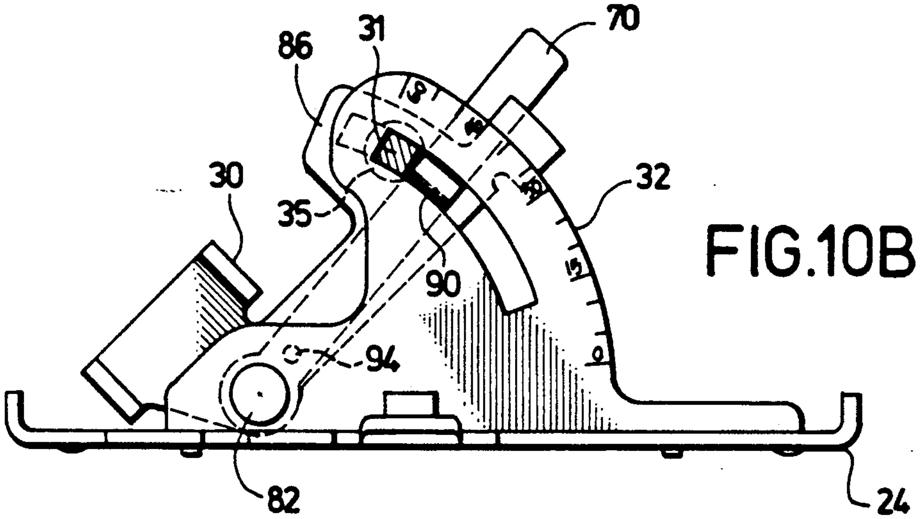
FIG. 10B is a front view of the quadrant with the spring stop at 45°.
Figure 10C:
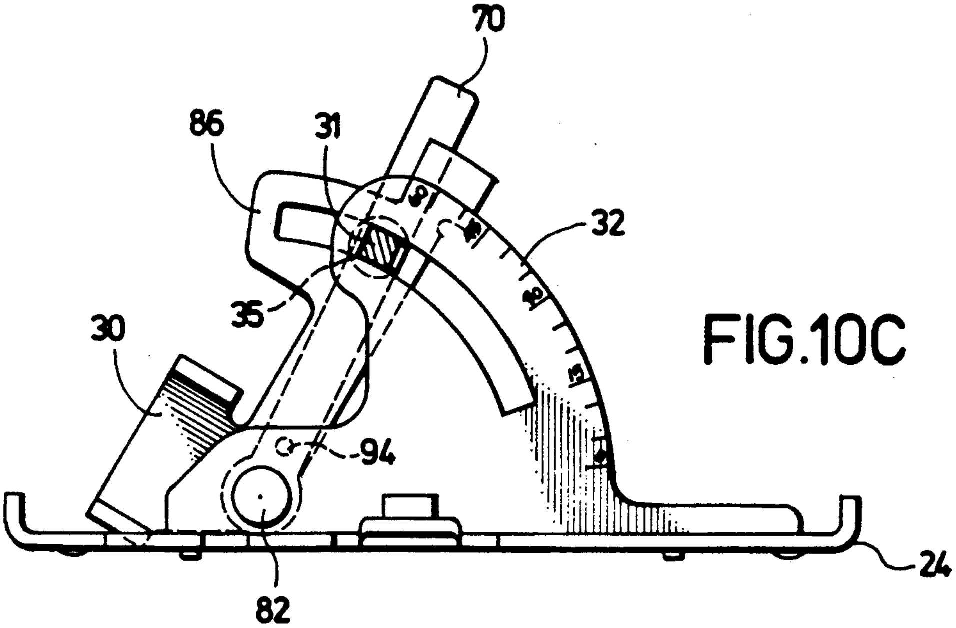
FIG. 10C is a front view of the quadrant with the spring stop at 60°.

A spring stop 70 shown in isometric view in FIG. 7 is used in conjunction with the hinge in FIGS. 8A and 8B and the quadrant 32 in FIG. 4 to provide a positive lock at 45° so that the saw blade 16 cannot be tilted beyond 45° until stop spring 70 is physically moved out of place, as will be shown hereafter, to allow the saw to be further tilted to a 60° angle for the 60° cut. Thus, the 45° cut is automatically obtained and the 60° cut must be manually obtained. Thus, hinge 30 illustrated in FIG. 8A has as an integral part thereof a U-shaped bracket 72 with legs 74 and 76 having orifices 78 and 80 respectively therein for mounting the forward end of upper guard 12 to the hinge 30. The orifice 82 is coupled to the front pivot point 26 shown in FIG. 1 and FIG. 2. The hinge 30 has a projecting arm 84 from which extends a projection 86 with an arcuate slot 88 therein. The spring stop 70 is also mounted about pivot orifice 82 of hinge 30 and has a projection 90 which extends through arcuate orifice 8. Because a circular pin 92 on hinge bracket 30 extends through orifice 94 of spring stop 70, spring stop 70 moves with hinge 30 as it pivots about the center of orifice 82. FIG. 10A illustrates the quadrant 32, hinge 30 and spring stop 70 when the saw blade 16 is in the vertical position. A bolt having a head 35 and a body 31 shown in cross-section is part of positive lock arm 33 in FIG. 1 and is slidably mounted in slot 56 of quadrant 32 and slot 88 of hinge 30. As shown in FIG. 10B, when the hinge 30 is pivoted, it carries bolt 31 with it. When hinge 30 has been pivoted sufficiently far that the bolt body 31 contacts the end of slot 56 on quadrant 32, the motor can no longer pivot and the saw blade is at the 45° position. This position is a positive stop. To rotate the motor beyond the 45° position where the motor is now locked, spring stop 70 must be manually depressed so that the projection 90 moves out of slot 88 in hinge 30 and away from the bolt head 35 and the saw guard and blade can then continue rotating to the 60° mark where it automatically locks again when the bottom of slot 88 of hinge 30 contacts bolt body 31. Thus, the saw is automatically positioned at 45° simply by rotating or pivoting the saw and when it reaches 45° it can no longer rotate because spring stop 70 contacts bolt head 35. In this manner, an automatic stop is provided for the 45° position. The position for the automatic stop at 45° is illustrated in FIG. 10B. After the spring stop 70 is manually removed from contact with bolt head 35 in the 45° locked position, the motor can then be rotated to 60° until the bottom of slot 88 of hinge 30 contacts bolt body 31 as illustrated in FIG. 10C.

Figure 9:
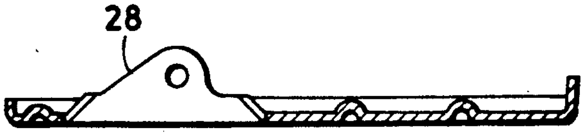
FIG. 9 is a cross-sectional view of the footplate taken along the width of the footplate and illustrating the rear pivot point.

FIG. 9 is a cross-sectional view of footplate 24 illustrating the rear pivot point to which the depth-of-cut bracket 40 is preferably attached by projection 46 and orifice 48 (shown in FIG. 3B).

Figure 11:
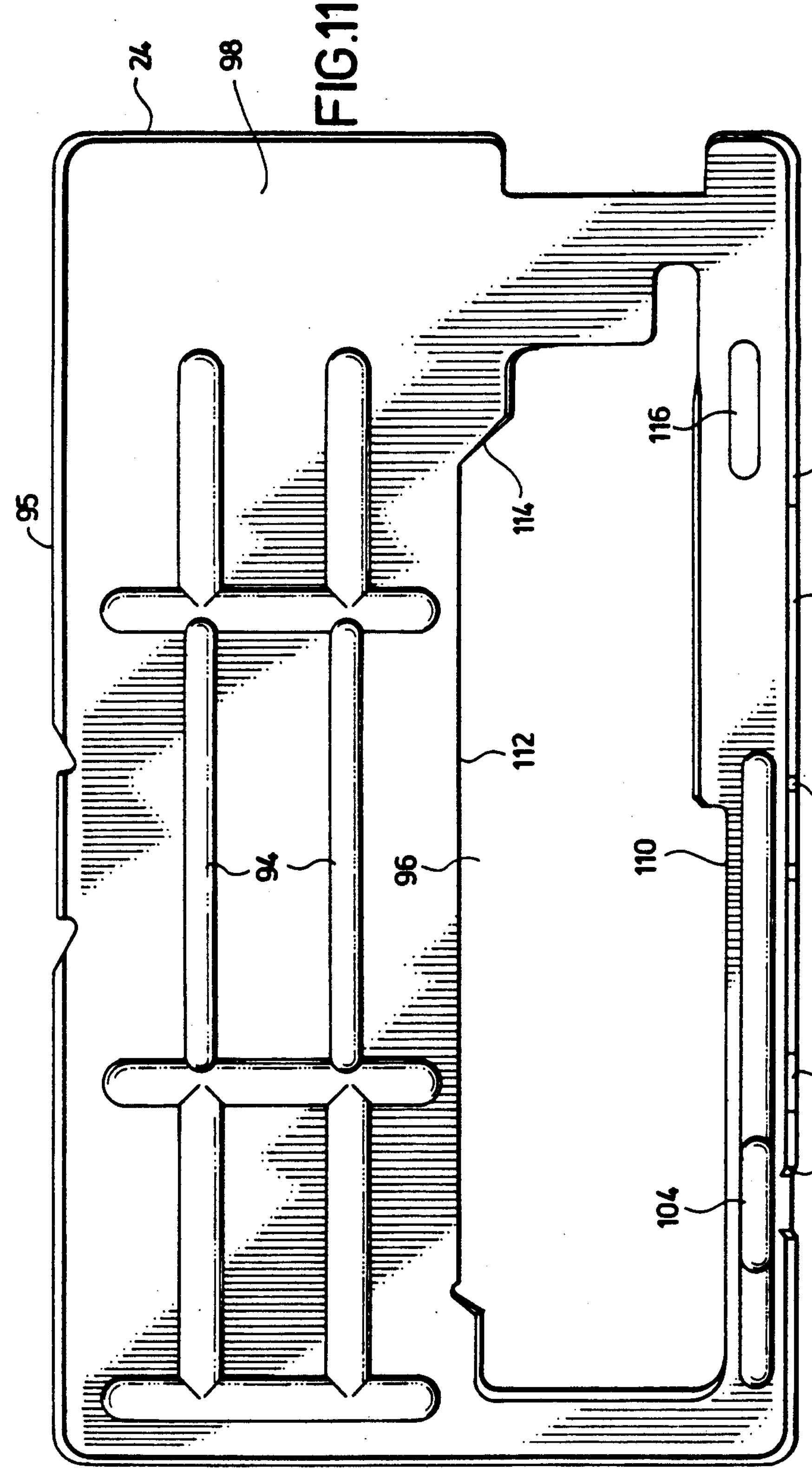
FIG. 11 is a plan view of the footplate.

FIG. 11 is a plan view of the footplate 24 that is specially designed for mounting the circular saw 10 such that it can be rotated at an angle to cut a 60° bevel. Note that the foot 24 has strengthening ribs 94 as well as raised edges 95 on the periphery thereof to give rigidity and strength to the foot 24. Front area 98 is the area on which the quadrant 32 is mounted as by riveting or preferably welding, as explained previously. The saw blade 16 extends in a vertical plane through opening 96 with the rear of the saw mounted to pivot point 28 and the front to pivot point 26 on the quadrant bracket 32 when it is attached to area 98. As best seen in FIG. 11, edge 99 of foot 24 has portions 106 and 109 removed sufficiently to allow the upper guard 12 to clear the foot 24 when the saw is in its 60° position. In addition, an elongated recess 110 is formed in one side of opening 96 of footplate 24 to accommodate the lower guard when it is tipped into the 60° position for cutting a 60° bevel. Without having the elongated recess 110, the saw 10 could not rotate sufficiently far to perform a 60° bevel cut.

Figure 12:
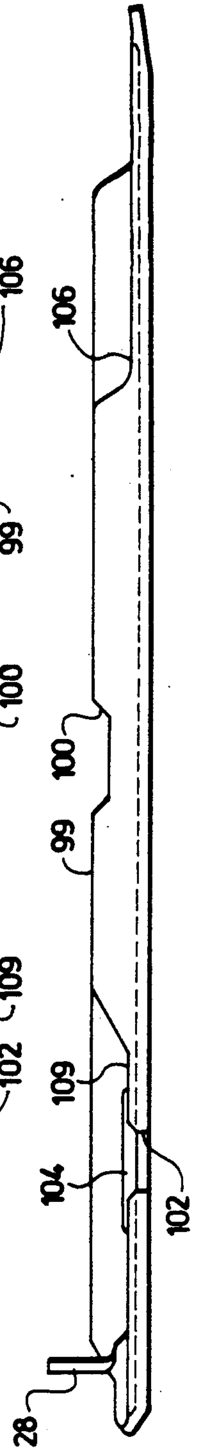
FIG. 12 is a side view of the footplate.

When the saw is at the angle of 60° for cutting a 60° bevel cut, it is important that the lower guard be rotated partially to the rear to widen the gap between the forward end of the lower guard and the underside of foot 24 to provide sufficient clearing between the saw blade 16 and the workpiece. To accomplish that rotational movement of the lower guard 14, a rib 104 is formed on the one side of footplate 24 not only as a strengthener for the narrow side of footplate 24, but also to contact a sloping surface 27 on the lower guard 14 to force the sloping surface and the attached lower guard to move or rotate in the direction of arrow 29 and widen the gap that exists between the front edge 15 of the lower guard 14 and the lower portion of the footplate 24 automatically. The opening 102 in edge 99 allows the sloped surface 27 on the guard to clear the edge 99 and enables the entire saw to be tipped a full 60°. The side view of the footplate 24 is illustrated in FIG. 12 wherein the recessed surface 100 for the blade bolt 19 that holds the saw blade to the motor shaft can be seen. Further, the recesses 106 and 109 which allow the upper guard 12 to be accommodated are also shown. Also, the opening 102 and the rib 104 for causing the lower guard 14 to move such that it opens the gap between the front edge 15 of the guard 14 and the footplate 24 can also be seen. Recess 112 and sloped edge 114 on the other side of opening 96 accommodate the other side of upper guard 12 when the saw is tipped to make the 60° bevel cut. Orifice 116 accommodates the lower leading edge 118 of the upper guard 12 when the unit is tipped in a 60° position. Thus, the entire saw is designed in conjunction with the footplate 24 so that it can be tipped or rotated 60° to perform a 60° bevel cut without any portion of the saw blade or guards contacting the footplate 24. This allows the lower guard 14 to be fully and automatically rotated as needed during making the cut and yet it will restore itself automatically to the shielding position when the saw is removed from the workpiece. In addition, the cut is entirely through a 2X workpiece.

Thus, there has been disclosed a novel portable circular saw that can cut a 60° bevel angle on a workpiece and cut entirely through 2X material at the 60° angle. This is accomplished by using an 8¼ inch diameter blade, mounting the unit on a footplate with front and rear pivot points that are of a distance above the top of the footplate such that at least a minimum amount of the saw blade protrudes below the footplate so that at an angle of 60° the saw can cut entirely through a 2X workpiece. The ability of the novel saw to accomplish this 60° cut includes not only the ability to rotate 60° about front and rear pivot points, but also to pivot upwardly about a hinge or pivoting device so that the various components of the saw which would normally strike the footplate in the 60° position are raised sufficiently to avoid striking the foot piece 24. In conjunction with the ability of the saw to change its depth of cut position to that necessary for enabling a 60° bevel cut and causing the components of the saw that project to the side to miss the footplate 24, portions of the footplate have been removed sufficiently to allow the upper and lower guards 12 and 14 to clear any contact with the footplate 24. Also, there has been disclosed a novel latching mechanism that allows the saw to be rotated to the 60° position but it must come to a positive stop at the 45° position and then be manually released to rotate further to the 60° position. This is a safety feature of the invention which is important.

While the invention has been shown and described with respect to a particular embodiment thereof, this is for the purpose of illustration rather than limitation; other variations and modifications of the specific embodiment herein shown and described will be apparent to those skilled in the art all within the intended spirit and scope of the invention. Accordingly, the patent is not to be limited in scope and effect to the specific embodiment shown and described nor in any other way that is inconsistent with the extent to which the progress in the art has been advanced by the invention.

We claim:

1. A circular saw for cutting 2X lumber at an angle of 60° with the vertical comprising:

a motor housing assembly;

a circular saw blade having a diameter of at least 8¼ inches attached to the saw blade with a blade bolt and washer;

a footplate having an opening therein for receiving the saw blade;

a front and a rear pivot point on said footplate and connected to said motor housing assembly for enabling said housing assembly and said attached saw blade to be rotated at least 60° from the vertical;

said front and rear pivot points having a height above the footplate such that, when supporting the guard in substantially the horizontal position, the distance of the lowest portion of the saw blade below the housing will have a vertical component sufficient to pass through 2X lumber when the blade is rotated 60°;

pivoting means coupled to one of the front and rear pivot points for enabling the depth of the saw extending below the footplate to be adjusted by pivoting the motor housing assembly upwardly and downwardly about the pivoting means in the plane of the saw blade; and a depth-of-cut bracket mounted on the footplate of the motor housing assembly at the end opposite the pivoting means and having indicia thereon to indicate the depth of cut when the housing is pivoted about the pivoting means to the position indicated, said bracket having 60° indicia thereon to indicate the proper pivot angle of the motor housing for a 60° cut.

2. A circular saw as in claim 1 wherein the pivoting means is a hinge located at the front of the motor housing assembly.

3. A circular saw as in claim 2 further including:

a lower pivotal saw guard on the housing for shielding the blade when the saw is not in cutting use;

means for holding the guard in a first rotated position with respect to the footplate at an angle of the saw of 0° from the vertical;

a sloping projection on the lower guard; and a rib on the footplate in a location to contact the lower guard sloping projection when the saw blade is tilted to the 60° position to cause the lower guard to move to a second position to facilitate proper operation of the lower guard as the 60° cut is made.

4. A circular saw as in claim 3 further including:

a quadrant associated with the front pivot point to indicate the angle of rotation of the motor housing and the saw;

means associated with the quadrant for locking the motor housing and saw at 45°; and means associated with the quadrant and locking means to manually override the lock and allow the housing assembly and saw to rotate to 60°.

5. A circular saw as in claim 4 further including means for providing sufficient clearance between the lower guard and the footplate when the saw is in the 60° position such that the lower guard automatically returns to its blade-shielding position after a 60° cut is completed.

6. A circular saw as in claim 5 wherein the clearance providing means comprises recesses and orifices provided in the footplate at points where interference would normally occur between the footplate and the upper guard and blade bolt and washer when the blade is rotated at the 60° angle and tilted about the hinge to the 60° indicia on the depth-of-cut bracket so as to prevent any interference of the footplate with the upper guard assembly and blade bolt and washer.

7. An improved circular saw for cutting material at a 60° bevel angle, the saw having a motor assembly driving a circular saw blade, the motor assembly being mounted on a footplate with the blade extending above and below an opening in the footplate, said assembly being mounted about front and rear pivot points for rotational movement of the plane of the blade, said assembly being mounted for pivotal movement about a hinge to change the depth of the cut, the improved circular saw comprising:

a first scale associated with one of the pivots and said assembly for indicating a bevel angle of the blade from 0° to 60° from vertical;

a second scale associated with the other pivot and said assembly for indicating the pivot angle of the assembly about the hinge with respect to the horizontal;

means associated with the motor assembly and the first scale for enabling the motor assembly and blade to be rotated until the outermost points of the motor assembly and blade contact the footplate; and means associated with the motor assembly and the second scale for enabling the motor assembly and blade to be pivoted upwardly about the hinge until the assembly does not contact the footplate with the blade at a rotated angle of 60°.

8. A method of enabling a circular saw to cut through 2X material at an angle of 60° with the vertical comprising the steps of:

mounting a circular blade having a diameter of at least 8¼ inches on a motor housing assembly;

rotatably mounting the housing assembly on a footplate with the saw blade extending through and below an opening in the footplate a distance such that, when rotated at an angle of 60° from the vertical, the saw blade will have a vertical component sufficient to pass through a 2X piece of material;

pivotally mounting the housing assembly on the footplate at a hinge point to allow the depth of cut of the saw blade to be adjusted; and adjusting the depth of cut in conjunction with the rotation of the housing to 60° to provide clearance between the footplate and the housing at the 60° angle so as to enable a 60° cut to be made through 2X material.

* * * * *